(12) United States Patent
Meisner et al.

(10) Patent No.: US 8,492,307 B2
(45) Date of Patent: Jul. 23, 2013

(54) MICROPOROUS CARBON AND METHOD FOR MAKING THE SAME

(75) Inventors: Gregory P. Meisner, Ann Arbor, MI (US); Qingyuan Hu, Madison Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 148 days.

(21) Appl. No.: 13/079,389

(22) Filed: Apr. 4, 2011

(65) Prior Publication Data

US 2011/0177940 A1    Jul. 21, 2011

Related U.S. Application Data

(62) Division of application No. 12/143,701, filed on Jun. 20, 2008, now abandoned.

(51) Int. Cl.
*C01B 31/12* (2006.01)
(52) U.S. Cl.
USPC ........................................................ 502/427
(58) Field of Classification Search
USPC ........................................................ 502/427
See application file for complete search history.

(56) References Cited

U.S. PATENT DOCUMENTS

| | | | |
|---|---|---|---|
| 4,082,694 A * | 4/1978 | Wennerberg et al. | 502/427 |
| 5,908,896 A * | 6/1999 | Mayer et al. | 524/596 |
| 6,297,293 B1 | 10/2001 | Bell et al. | |
| 6,812,187 B1 * | 11/2004 | Pak et al. | 502/180 |
| 2005/0207962 A1 | 9/2005 | Dietz et al. | |
| 2007/0035055 A1 | 2/2007 | Gee et al. | |
| 2007/0258879 A1 | 11/2007 | Karles et al. | |
| 2008/0025907 A1 | 1/2008 | Tennison et al. | |
| 2008/0107589 A1 | 5/2008 | von Blucher et al. | |

OTHER PUBLICATIONS

Guo et al., 'Effects of Activation Conditions on Preparation of Porous Carbon from Rice Husk' in Carbon vol. 41 pp. 1645-1648 (2000) no month.*
International Search Report for S.N. PCT/US2009/047303 dated Jan. 25, 2010 (12 pages).

* cited by examiner

*Primary Examiner* — Stuart Hendrickson
(74) *Attorney, Agent, or Firm* — Dierker & Associates, P.C.

(57) ABSTRACT

A substantially homogeneous composite for making a carbon material includes a carbon precursor and an activation agent that is soluble in a solution including the carbon precursor. An amount of the activation agent used is sufficient to form the carbon material having at least 90% of a total pore volume of the carbon material composed of micropores, and 10% or less of the total pore volume composed of mesopores and macropores.

6 Claims, 5 Drawing Sheets

MICROPOROUS CARBON AND METHOD FOR MAKING THE SAME

CROSS REFERENCE TO RELATED APPLICATIONS

This application is a divisional of U.S. patent application Ser. No. 12/143,701, filed on Jun. 20, 2008, now abandoned the entire contents of which is incorporated by reference herein in its entirety.

TECHNICAL FIELD

The present disclosure relates generally to microporous carbon and a method for making the same.

BACKGROUND

The use of hydrogen as an alternative to conventional fuels, especially for automotive applications, is currently being investigated. As such, the development of suitable hydrogen storage media for commercial hydrogen powered vehicles is also of interest. Current techniques for transporting and storing hydrogen include liquid hydrogen, compressed hydrogen, chemisorption and physisorption. Porous carbon materials (e.g., activated carbons, mesoporous carbons, porous carbon fibers and carbide-derived carbons) are widely used as adsorbents in industrial applications because of the high surface area, low cost and relatively good stability.

SUMMARY

A carbon material includes a carbonized composite formed from a substantially homogeneous composite including a carbon precursor and an activation agent that is soluble in a solution including the carbon precursor. Micropores having a substantially uniform size distribution are formed throughout the carbonized composite. At least 90% of a total pore volume of the carbon material is composed of micropores, and 10% or less of the total pore volume is composed of mesopores and macropores. A surface area of the carbon material ranges from about 1400 m$^2$/g and 3000 m$^2$/g. A method for forming the carbon material is also disclosed herein.

BRIEF DESCRIPTION OF THE DRAWINGS

Features and advantages of examples of the present disclosure will become apparent by reference to the following detailed description and drawings.

DETAILED DESCRIPTION

Embodiments of the method disclosed herein advantageously enable control over the porosity of microporous carbon materials. It is believed that homogeneous mixing of the carbon precursor and activation agent contributes to relatively uniform pore size distribution and high surface area of the formed porous carbon materials. As used herein, the phrase "relatively uniform pore size distribution" means that 90% or more of the pores in the material have a diameter equal to or less than 2 nm, and as such, the material does not have a broad distribution of pore sizes. In other words, 90% or more of the total pore volume is made up of micropores ($\leq$2 nm), and 10% or less of the total pore volume is made up of mesopores (2 nm-50 nm) and macropores (greater than 50 nm).

The microporous carbon materials disclosed herein may advantageously be used in a variety of applications, including catalysis, gas purification, fuel cell and battery electrodes, and gas storage. More particularly, the microporous carbon materials may be used, for example, as hydrogen storage media, catalyst supports, adsorbents, or electrodes.

Figure 1:
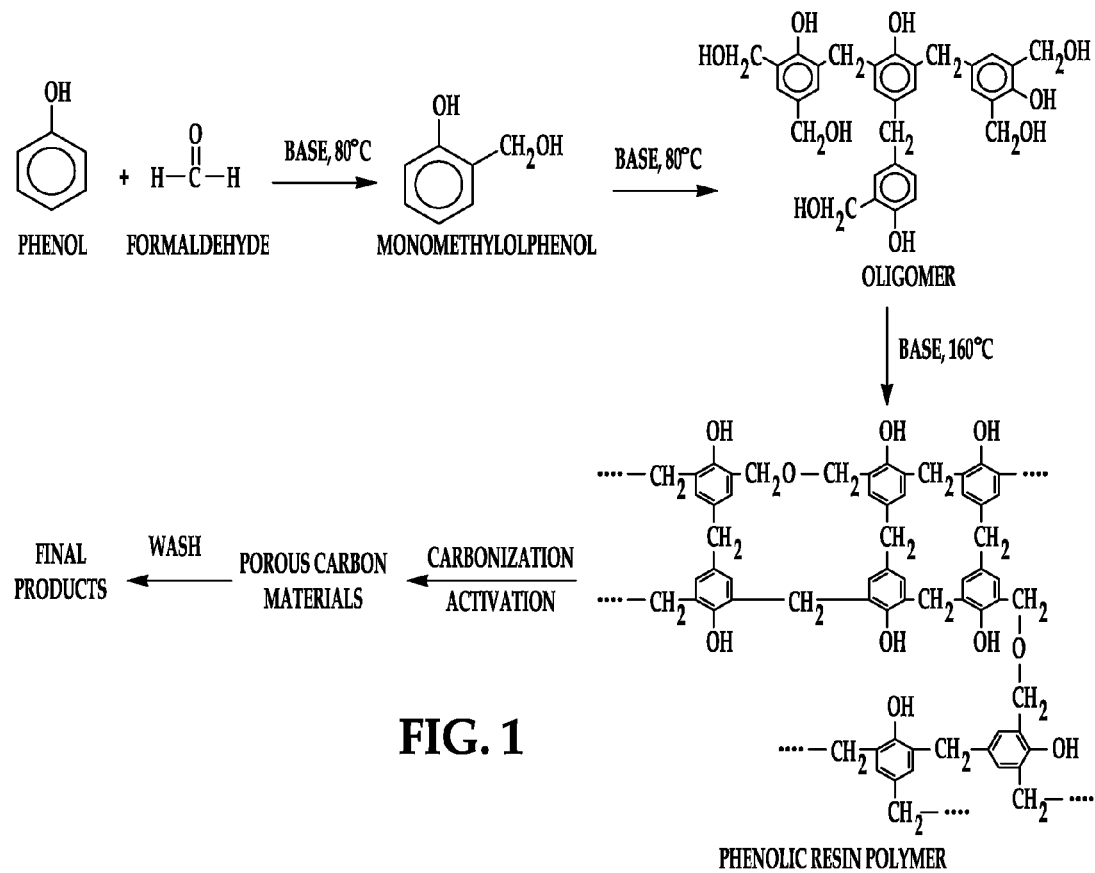
FIG. 1 is flow diagram illustrating an example of the synthesis of the microporous carbon material.

Referring now to FIG. 1, a non-limiting example of the method for making the microporous carbon material is depicted. Very generally, the method includes preparing a carbon precursor solution; mixing an activation agent in the carbon precursor solution to form a substantially homogeneous mixture; polymerizing the substantially homogeneous mixture to form a substantially homogeneous composite; and carbonizing the substantially homogeneous composite to form the microporous carbon material.

Suitable carbon precursors include phenolic resin oligomers, resorcinol, or phloroglucinol based resin oligomers. It is to be understood that such materials are used as a source or precursor of carbon that makes up the final material. The carbon precursor solution may be formed by reacting two or more starting materials (which form the carbon precursor) in a liquid medium in the presence of a catalyst. The starting materials will depend, at least in part, on the desirable carbon precursor that is to be formed. As shown in FIG. 1, a phenolic resin oligomer solution is prepared by reacting phenol and formaldehyde (in the presence of KOH or some other suitable catalyst) in a liquid medium (e.g., water or a mixture of water and alcohol, such as ethanol).

It is believed that the carbon precursor solutions disclosed herein are better starting materials than fully polymerized materials, at least in part because the activation agent can readily dissolve into the carbon precursor solution to form a homogeneous solution.

Once the carbon precursor solution is prepared, the activation agent is added thereto. The carbon precursor/activation agent mixture is stirred to achieve substantially uniform dispersal of the carbon precursor molecules and activation agent molecules in the solution. Such a homogeneous solution results, at least in part because the activation agent is soluble in the carbon precursor solution. It is believed that the homogeneity of the solution contributes to the substantially uniform pore size distribution and high surface area of the resulting microporous carbon material. Furthermore, the activation agent may also act as a catalyst for the synthesis and subsequent polymerization of the carbon precursor.

In one non-limiting example, potassium hydroxide (KOH) is used as the activation agent to form generally uniformly sized micropores in the carbon material. Other non-limiting examples of suitable activation agents include sodium hydroxide (NaOH), potassium carbonate, or sodium carbonate.

It is to be understood that the amount of activation agent used is sufficient to form a material having at least 90% of its total pore volume composed of micropores, and 10% or less of its total pore volume composed of mesopores and macropores. In such materials, the macropore volume is at or near 0%. As a non-limiting example, the weight ratio of activation agent to carbon precursor ranges from about 1 to about 3.

Furthermore, the surface area of the microporous carbon material may be adjusted by controlling the amount of the activation agent mixed into the carbon precursor solution. A desirable amount generally results in the surface area ranging from about 1400 $m^2/g$ or 2000 $m^2/g$ to about 3000 $m^2/g$ (as determined, for example, from Brunauer, Emmett and Teller (BET) nitrogen sorption surface area measurements).

The substantially homogeneous carbon precursor/activation agent solution is then exposed to heating at a predetermined temperature for a predetermined time. In a non-limiting example, heating is accomplished at about 160° C. for about 12-24 hours. Heating evaporates any solvent (e.g., water, or water and alcohol) and initiates cross-linking and polymerization, thereby forming a homogenous polymer/activation agent solid composite. A homogeneous phenolic resin oligomer/KOH solid composite is shown in FIG. 1.

The solid composite is then carbonized and activated at the same time by heating to a temperature ranging from about 500° C. to about 900° C. under an inert atmosphere (e.g., nitrogen or argon) for a time ranging from about 0.5 hours to about 8 hours. As indicated, the heating step causes the polymer to be converted to carbon while the activation agent acts as a chemical activation reagent on the carbon to create porosity. As such, the heating process results in the formation of the final microporous carbon material.

The final product may then be washed with dilute hydrogen chloride one or more times and with hot water several times to remove any residual activation agent and other impurities.

To further illustrate embodiment(s) of the present disclosure, an example is given herein. It is to be understood that this example is provided for illustrative purposes and is not to be construed as limiting the scope of the disclosed embodiment(s).

EXAMPLE

Sample Preparation

Oligomeric phenol-formaldehyde was synthesized by reacting 13 mmol phenol, 26 mmol formaldehyde and 1.3 mmol potassium hydroxide at 70° C. for about 1 hour. A desired amount of potassium hydroxide solution (5M) was added gradually into the phenol-formaldehyde oligomer solution under stirring. Various samples (C-1 through C-18 in Table 1 below) were made using different ratios of KOH to oligomeric phenol-formaldehyde. The oligomer-KOH solutions were heated in an oven at 160° C. overnight. During this heating process, the phenol-formaldehyde oligomers continued to crosslink and polymerize to form a thermoset, carbonizable polymer under the catalysis of potassium hydroxide.

The polymers were then carbonized/activated at high temperature (ranging from about 500° C. to about 900° C.) under an inert atmosphere. The final carbon materials were rinsed several times with dilute hydrochloric acid and de-ionized water, and dried in an oven at 150° C. overnight.

Sample Characterization

The samples were characterized using nitrogen sorption surface area measurements (Micromeritics ASAP 2010 operated at 77K). Cryogenic hydrogen sorption measurements at high pressures were performed using a PCTPro 2000 (Hy-Energy Scientific Instruments) at 77K and room temperature.

Results

Figure 2:
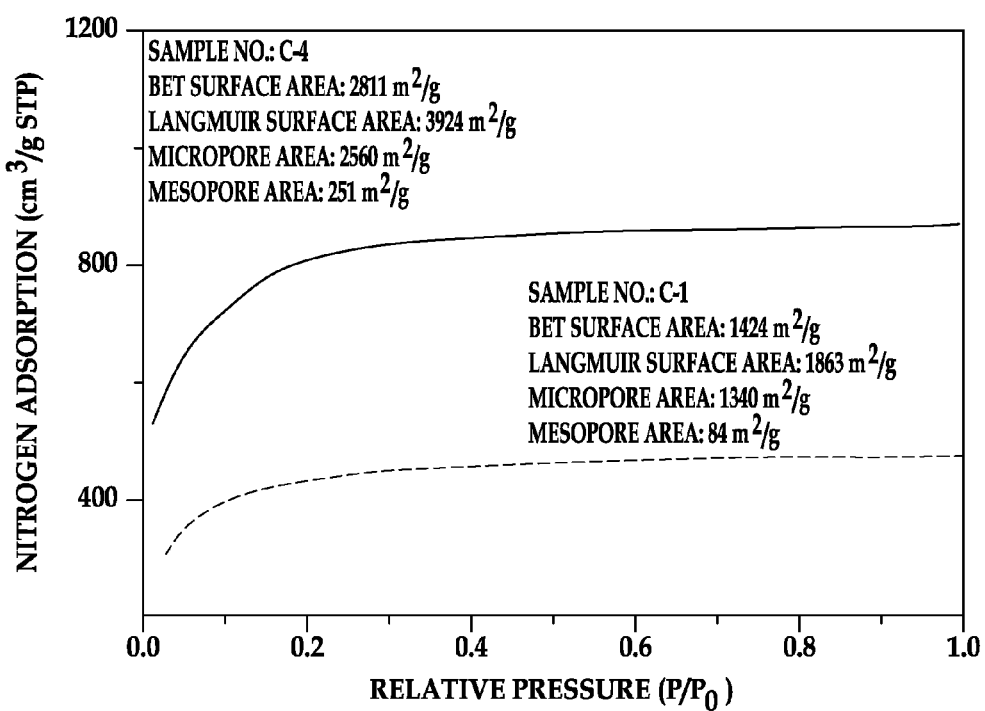
FIG. 2 is a graph depicting nitrogen adsorption isotherms of microporous carbons prepared with different ratios of activation agent and carbon precursor.

High surface area microporous carbon materials were obtained using the process disclosed herein. FIG. 2 illustrates nitrogen adsorption isotherms of microporous carbons (samples C-1 and C-4) prepared with different ratios of activation agent and carbon precursor. Table 1 shows the detailed synthesis conditions and the hydrogen absorption capacities of the obtained porous carbons at 77K and 40 bar.

TABLE 1

BET surface areas and hydrogen absorption capacities (at 77K and 40 Bar) of the porous carbon materials

| Sample number | Weight ratio of KOH to oligomer | Carbonization/ Activation Temp. (° C.) | Carbonization/ Activation Time (hour) | BET surface area ($m^2/g$) | Excess Hydrogen Absorption (wt. %) |
|---|---|---|---|---|---|
| C-1 | 1 | 700 | 4 | 1424 | 2.81 |
| C-2 | 1.5 | 700 | 4 | 1662 | 3.69 |
| C-3 | 2 | 700 | 4 | 2711 | 5.25 |
| C-4 | 2.2 | 700 | 4 | 2811 | 5.68 |
| C-5 | 2.25 | 700 | 4 | 2943 | 5.75 |
| C-6 | 2.5 | 700 | 4 | 2466 | 4.86 |
| C-7 | 1 | 800 | 4 | 1587 | 3.30 |
| C-8 | 1.5 | 800 | 4 | 2075 | 3.91 |
| C-9 | 2 | 800 | 4 | 2698 | 5.02 |
| C-10 | 2.25 | 800 | 4 | 2441 | 4.84 |
| C-11 | 2.5 | 800 | 4 | 1992 | 3.33 |
| C-12 | 2 | 700 | 0.5 | 1627 | 3.05 |
| C-13 | 2 | 700 | 1 | 1752 | 3.32 |
| C-14 | 2 | 700 | 2 | 2438 | 4.30 |
| C-15 | 2 | 700 | 8 | 2625 | 4.51 |
| C-16 | 2 | 500 | 4 | 1627 | 3.50 |
| C-17 | 2 | 600 | 4 | 2228 | 4.36 |
| C-18 | 2 | 900 | 4 | 2545 | 4.61 |

As shown in Table 1, the surface areas of the porous carbon materials were high (a non-limiting example of which was 2943 m$^2$/g). It is believed that the higher surface area and uniform pore size distribution is a result of the homogeneous mixing of the carbon precursor and activation agent.

In this example (as shown in Table 1), the porous carbons were prepared at a weight ratio of activation agent (KOH) to carbon precursor ranging from 1 to 2.5, carbonization/activation temperature ranging from 500° C. to 900° C., and carbonization/activation time up to 8 hours. The optimal activation conditions were experimentally determined.

Figure 3:
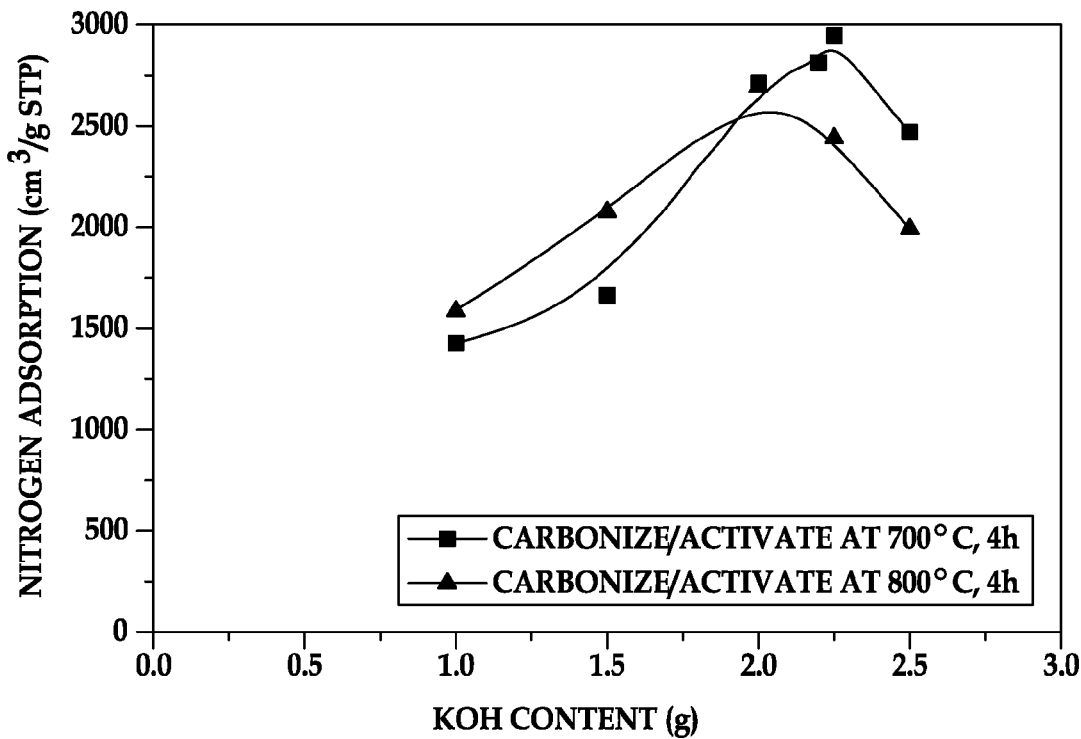
FIG. 3 is a graph illustrating the effect of potassium hydroxide (KOH) content on the surface area of microporous carbons.

FIG. 3 shows the effect of KOH content on the surface area. From these results, it can be seen that the ratio of activation agent to carbon precursor affects the surface area and porosity of the final products. At 700° C., with the increase of KOH content from 1 g to 2.25 g, the surface area was doubled. As shown in FIG. 3, additional increases in the KOH content decreased the surface area, which indicates that the microstructures of the obtained porous carbons may partially collapse when the wall is etched too much. The results are similar at 800° C. FIG. 3 further illustrates that at low KOH content, a higher activation temperature results in higher surface areas. It is believed that these phenomena can be explained by the mechanism of the KOH activation process disclosed herein. During the high temperature activation process, the KOH reacts with carbon, and the pores are created by etching carbon molecules from the bulk carbon materials. It is believed that higher temperatures result in a higher etching rate. More carbon molecules will be removed at higher KOH content or higher temperature, which increases the porosity and surface area of the carbon material. However, if the etching process is too fast and/or too violent, larger pores may be formed, and the carbon framework may become too thin to support itself. In such instances, the carbon framework partially collapses, and the surface area decreases.

Figure 4:
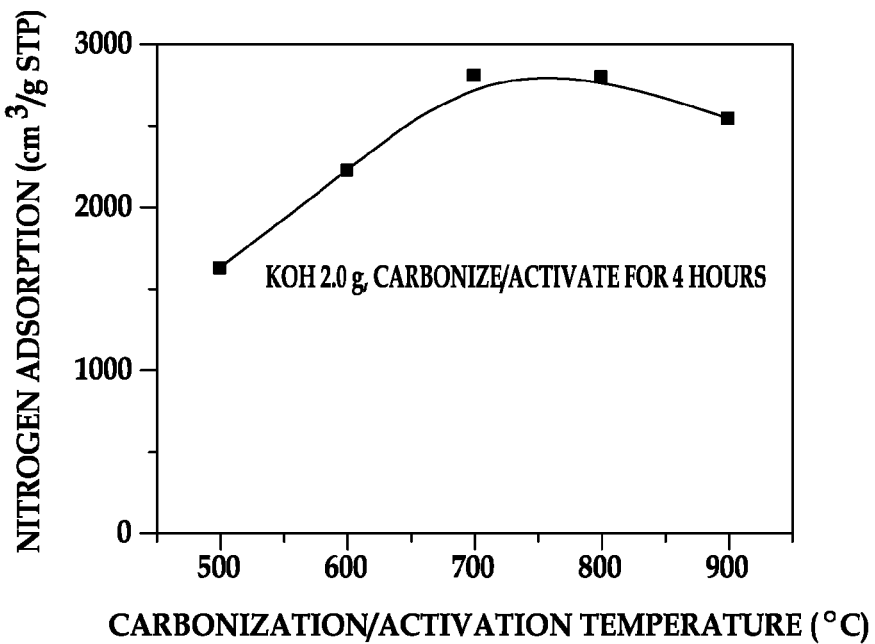
FIG. 4 is a graph illustrating the effect of carbonization/activation temperature on the surface area of microporous carbons.
Figure 5:
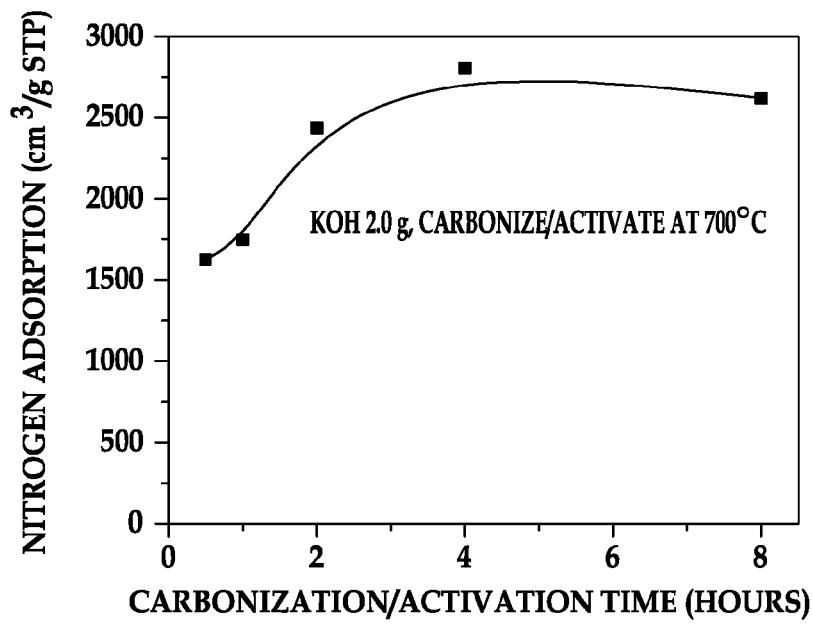
FIG. 5 is a graph illustrating the effect of carbonization/activation time on the surface area of microporous carbons.

FIGS. 4 and 5 illustrate the effect of carbonization/activation temperature and carbonization/activation time on the surface area, respectively. As shown in the Figures, the surface areas of obtained porous carbon materials increase with increased carbonization/activation time up to 4 hours and temperature up to 700° C. through 800° C., and then decrease with further increased carbonization/activation time and temperature. It is believed that this behavior can also be explained by the mechanism of the KOH activation process disclosed herein.

In this example, hydrogen sorption isotherms of the microporous carbons were measured using a cryostat attached to a PCTPro 2000 apparatus at different temperatures and hydrogen pressure up to 40 bar. The detailed hydrogen absorption capacities of the porous carbons are shown in Table 1 above.

Figure 6:
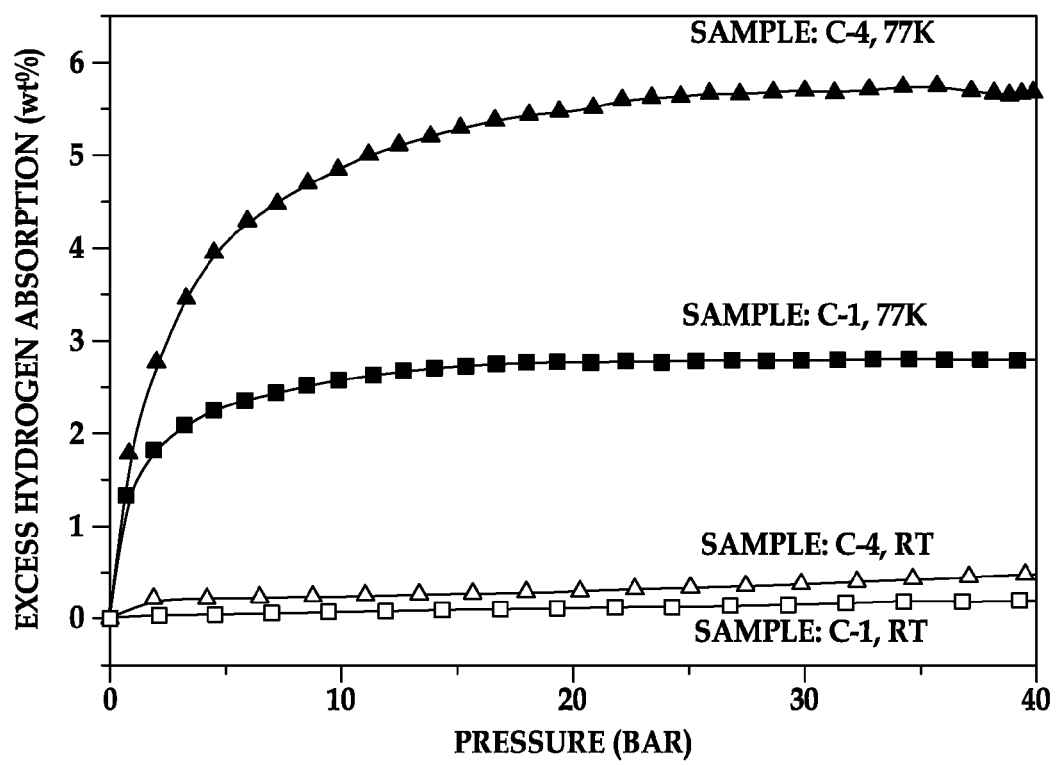
FIG. 6 is a graph depicting excess hydrogen absorption isotherms of microporous carbons at 77K and room temperature.

FIG. 6 shows the hydrogen absorption isotherms of samples C-1 and C-4 at 77K and room temperature. The hydrogen uptake at 77K increased with increased pressure and reached saturation at about 25 bar. As shown in the Figure, the sample with the larger surface area had a higher hydrogen uptake. Specifically, sample C-4 with surface area of 2811 m$^2$/g absorbed 5.7 wt % at 40 bar, and sample C-1 with surface area of 1424 m$^2$/g absorbed 2.8 wt % at 40 bar. At room temperature, the microporous carbons absorb very limited hydrogen, for example, sample C-4 absorbed about 0.5 wt % hydrogen at 40 bar. It is believed that at room temperature, the hydrogen absorption on the high surface area carbon materials is limited, at least in part, because of the weak interaction between hydrogen molecules and the carbon surface. Cryogenic condition may be applied to depress the thermal motion of the hydrogen molecules.

Figure 7:
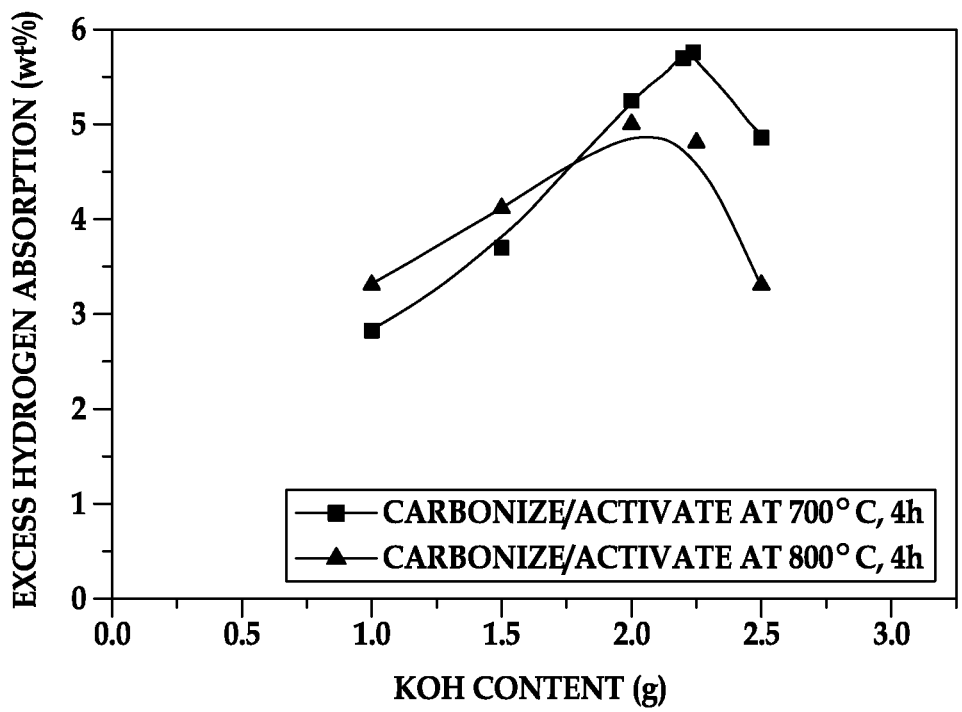
FIG. 7 is a graph illustrating the effect of KOH content on hydrogen uptake at 77K of the microporous carbons.

FIG. 7 shows the effect of the ratio of KOH to carbon precursor on the hydrogen uptake of microporous carbons at different carbonization/activation temperatures. FIGS. 2 and 3 (discussed hereinabove) illustrate that the ratio of KOH to carbon precursor may be used to control the surface area and porosity of the obtained carbon materials. It is also believed that the KOH (or other activation agent) content affects the hydrogen absorption of the obtained microporous carbons. In fact, FIG. 7 is similar to FIG. 3 because the change of the hydrogen uptake reflects the change of the surface area. When carbonization/activation takes place at 700° C., the hydrogen uptake at 77K and 40 bar of the samples increased from 2.8 wt % to 5.75 wt % with the KOH content increased from 1 g to 2.25 g. As shown in FIG. 7, further increases in the KOH content led to the decrease of the hydrogen absorption capacities.

Figure 8:
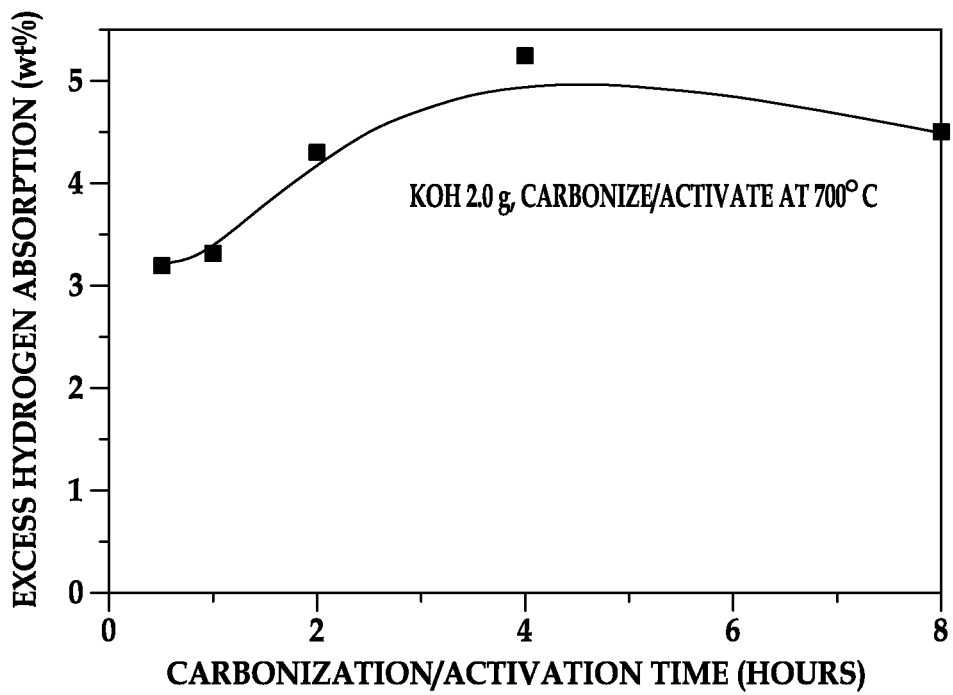
FIG. 8 is a graph illustrating the effect of carbonization/activation time on the hydrogen uptake at 77K of the microporous carbons.
Figure 9:
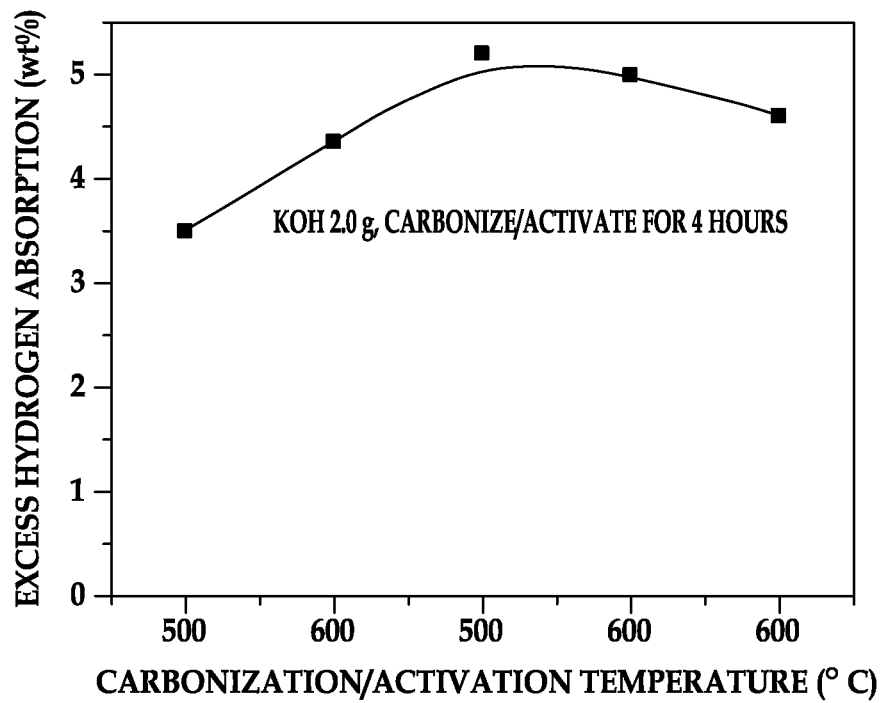
FIG. 9 is a graph illustrating the effect of carbonization/activation temperature on the hydrogen uptake at 77K of the microporous carbons.
Figure 10:
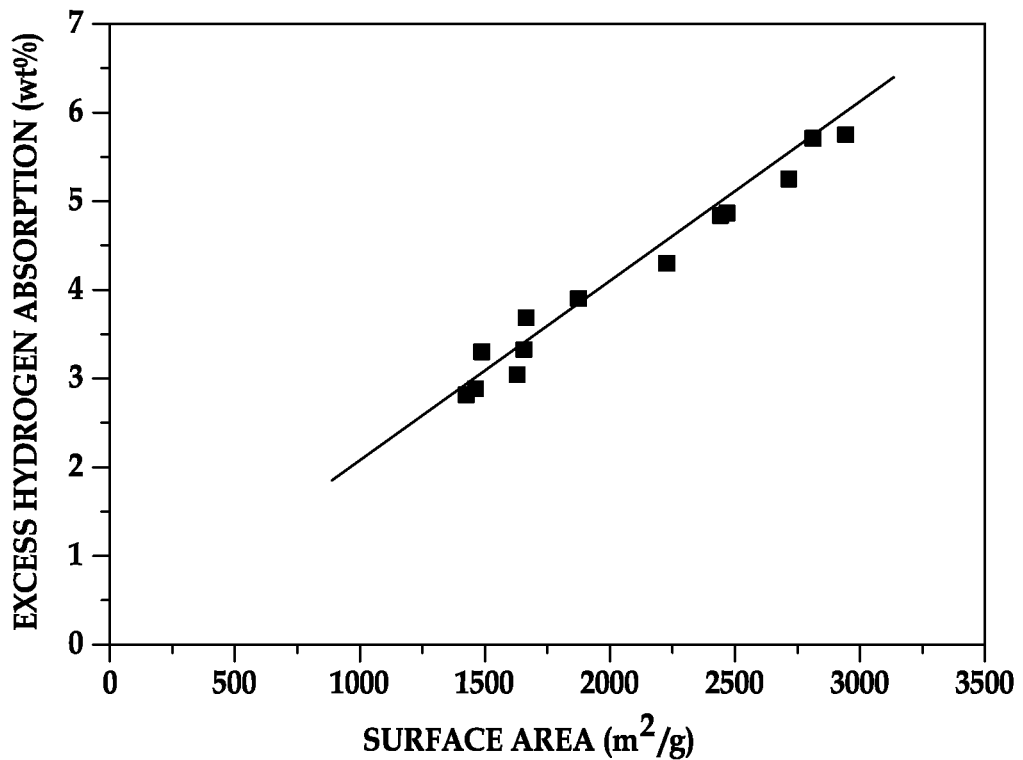
FIG. 10 is a graph depicting the relationship of surface area and hydrogen absorption capacity at 77K and 40 bar.

FIGS. 8 and 9 show the effect of carbonization/activation time and temperature on the hydrogen absorption capacities of the microporous carbons. Similar to the effect that time and temperature had on the surface area (see FIGS. 4 and 5), the hydrogen uptake increased with an increase in carbonization/activation time and temperature, and then decreased with additional increases in carbonization/activation time and temperature. Since the surface areas and hydrogen uptake of the porous carbons illustrate high correlativity, the relationship of surface areas and hydrogen absorption capacity at 77K and 40 bar is shown in FIG. 10. At cryogenic condition, a linear relationship is obtained between the surface area and the amount of hydrogen absorbed.

The chemical activation synthesis method disclosed herein involves an activation agent and a carbon precursor that are mixed substantially homogeneously. This process results in the formation of microporous carbon materials with desirably high surface areas and relatively uniform pore size distribution throughout the material. It is believed that the ratio of activation agent to carbon precursor and the temperature of the carbonization/activation process affect the final surface area and porosity, and thus enable control over the structure of the resulting carbon material. The microporous carbons disclosed herein advantageously have a substantially uniform pore size distribution, a micropore volume greater than or equal to 90%, a high surface area, and hydrogen absorption capacity up to 5.75 wt % at pressures at or above 25 bar (where uptake reaches a saturation point) and about 77K.

While several examples have been described in detail, it will be apparent to those skilled in the art that the disclosed examples may be modified. Therefore, the foregoing description is to be considered non-limiting.

The invention claimed is:

1. A method for making microporous carbon, comprising:
preparing a carbon precursor solution consisting of:
  a carbon precursor chosen from phenolic resin oligomers, resorcinol, and phloroglucinol based resin oligomers; and
  a liquid medium selected from the group consisting of water, and a mixture of water and an alcohol;
selecting an activation agent that is soluble in the carbon precursor solution, the activation agent being chosen from potassium hydroxide, sodium hydroxide, potassium carbonate, and sodium carbonate;
mixing the activation agent in the carbon precursor solution to form a substantially homogeneous mixture of the activation agent dissolved in the carbon precursor solution;
then heating the substantially homogeneous mixture of the activation agent dissolved in the carbon precursor solution, thereby polymerizing the substantially homogeneous mixture and forming a substantially homogeneous composite; and substantially simultaneously carbonizing and activating the substantially homogeneous composite.

2. The method as defined in claim 1 wherein the carbon precursor solution is prepared by reacting phenol with formaldehyde in the liquid medium in the presence of a catalyst.

3. The method as defined in claim 1, further comprising mixing a controlled amount of the activation agent in the carbon precursor solution to control a surface area of the microporous carbon.

4. The method as defined in claim 1 wherein mixing includes stirring the activation agent in the carbon precursor solution.

5. The method as defined in claim 1 wherein carbonizing and activating are accomplished by heating the substantially homogeneous composite to a temperature ranging from about 500° C. to about 900° C. under an inert atmosphere for a predetermined time period ranging from about 0.5 hours to about 8 hours.

6. The method as defined in claim 1, further comprising washing the substantially homogeneous carbonized composite.

* * * * *